United States Patent
Scollo et al.

(10) Patent No.: US 7,391,198 B2
(45) Date of Patent: Jun. 24, 2008

(54) METHOD AND CELL FOR CONTROLLING THE POWER FACTOR OF A POWER SUPPLY LINE

(75) Inventors: Rosario Scollo, Misterbianco (IT); Marc Laudani, Acicastello (IT); Antonino Gaito, Caccamo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 463 days.

(21) Appl. No.: 11/041,519

(22) Filed: Jan. 21, 2005

(65) Prior Publication Data

US 2006/0087261 A1    Apr. 27, 2006

(30) Foreign Application Priority Data

Jan. 22, 2004    (EP)    ................... 04425034

(51) Int. Cl.
*G05F 1/40*    (2006.01)
*H05B 37/00*    (2006.01)

(52) U.S. Cl. .................. 323/284; 323/288; 323/289; 323/290

(58) Field of Classification Search ................ 323/222, 323/282, 284, 288, 289, 290; 315/209 R, 315/307

See application file for complete search history.

(56) References Cited

U.S. PATENT DOCUMENTS 4,200,813 A * 4/1980 Van Schaik et al. ......... 323/289
4,792,746 A * 12/1988 Josephson et al. .......... 323/290
6,023,132 A    2/2000 Crouse et al. .............. 315/307
6,275,013 B1    8/2001 Higuchi ..................... 323/222
6,281,638 B1    8/2001 Moisin ...................... 315/244
2003/0210504 A1    11/2003 Otake ........................ 361/100

* cited by examiner

*Primary Examiner*—Jessica Han
(74) *Attorney, Agent, or Firm*—Lisa K. Jorgenson; E. Russell Tarleton; Seed IP Law Group PLLC

(57) ABSTRACT

A method for controlling the power factor of a power supply line is described, the method using a power factor control cell connected to the power supply line. Advantageously according to the invention, the power factor control is performed by adjusting the turn-on and turn-off time of a bipolar transistor comprised in the power factor control cell. A cell for controlling the power factor of a power supply line is also described, of the type comprising a first and a second input terminals, a first and a second output terminals, the first input terminal being connected to the first output terminal by means of the series of an inductor and a diode, connected to each other in correspondence with an internal circuit node and the second input terminal and the second output terminal being connected to each other. Advantageously according to the invention, the control cell comprises a bipolar transistor inserted between the internal circuit node and the second input terminal and having a control terminal receiving a control signal derived from a signal having an elementary alternated trend.

15 Claims, 5 Drawing Sheets

METHOD AND CELL FOR CONTROLLING THE POWER FACTOR OF A POWER SUPPLY LINE

BACKGROUND OF THE INVENTION

1. Field of the Invention

The present invention relates to a method and cell for controlling the power factor of a power supply line and, more particularly, to a method for controlling the power factor of a power supply line using a cell for controlling the power factor connected to said power supply line.

2. Description of the Related Art

As is known, the need of a higher and higher power, together with an improved quality of the power itself, has made it necessary to develop circuit topologies capable of providing improved electric performance and advantages also in terms of weight and dimensions.

From the physical point of view, the weight and dimensions of the components of these circuit topologies have been reduced by using applications operating at a higher frequency than the supply frequency (typically 50-60 Hz).

From the electric point of view, performances have been improved mainly in terms of quality of the supplied electric power. In particular, the problem of the harmonic content linked to the use of circuit topologies having components operating at high frequencies has been encountered, such harmonic content being capable of lowering the so-called power factor (PF). Several methods are known that are suitable for increasing the power supplied by the circuits and to reduce the harmonic content in the current of the network whereto these circuits are connected.

One of the known methods provides the use of a circuit network capable of correcting the power factor PF. This network is commonly indicated with the term PFC cell. The main feature of this network is that of creating an input current waveform of the sinusoidal type and in phase with the network voltage.

There are different techniques to obtain this behaviour. One well-known technique exploits the so-called dither effect, and it uses an energy buffer and a high-frequency voltage or current signal (dither signal) to realize a Single Stage Converter (SSC) stage.

In particular, FIG. 1 schematically shows possible configurations of PFC cells using the technique based on the dither effect and inserted between a first T1 and a second network terminal T2. In this FIG. 1, dither signal generators have been indicated with D and buffer elements of the first order of the PFC cells (such as a capacitor or an inductor) with Z.

In particular, this FIG. 1 shows configurations wherein the series of the buffer element Z and of the dither signal generator D is (A) connected to the first network terminal T1, or (B) between the first network terminal T1 and the second network terminal T2 (F), wherein the buffer element Z is inserted between the first network terminal T1 and the second network terminal T2, and the dither signal generator D is connected to the first network terminal T1, or (C) wherein the buffer element Z is connected to the first network terminal T1 and the dither signal generator D is inserted between the first and second network terminals T1, T2, downstream the buffer element Z or, (D) upstream of the buffer element Z, or (E) wherein the buffer element Z and the dither signal generator D are in parallel to each other and connected to the first network terminal T1.

The circuit topologies being shown realize first-order PFC cells and they allow the conduction time of the rectifier diodes to be increased, linearizing the trans-feature of these diodes and increasing therefore the power factor PF of the circuit topology as a whole.

The dither signal is usually obtained by a power stage being cascade-connected to the PFC cell, and by using a stage operating at high frequency the dither signal will also be at high frequency.

By conveniently configuring the PFC cell, the input current can take the waveform of a pulse train, whose envelope reproduces the sinusoidal trend of the network voltage. Finally, by removing high-frequency components, using for example a low-pass filter, a sinusoidal waveform is obtained and thus a high value of the power factor PF.

Besides the dither effect principle, there are other circuit topologies among which the most widespread is that based on the principle commonly known as boost converter.

A typical diagram of a PFC cell based on this principle is schematically shown in FIG. 2. The PFC cell 20 essentially comprises a controlled switch SW. In particular, the PFC cell 20 has a first I1 and a second input terminal I2, as well as a first output terminal O1 and a second output terminal O2.

The first input terminal I1 is connected to the first output terminal O1 by means of the series of an inductor L and a diode D, connected to each other in correspondence with an internal circuit node X.

The second input terminal I2 is directly connected to the second output terminal O2.

The controlled switch SW is inserted between the internal circuit node X and the second input terminal I2, i.e., the second output terminal O2, and it has a driving terminal connected to a convenient driving circuit 22.

The PFC cell 20 is connected to the first network terminal T1 and a second network terminal T2 by means of a diode bridge 21. In particular, the diode bridge 21 comprises a first pair of diodes D1, D2 inserted between the first input terminal I1 and the second input terminal I2 of the PFC cell 20 and interconnected in correspondence with the first network terminal T1, as well as a second pair of diodes D3, D4 inserted, in parallel to the first pair of diodes D1, D2, between the first input terminal I1 and the second input terminal I2 and interconnected in correspondence with the second network terminal T2. The diode bridge 21 comprising the pairs of diodes D1-D2 and D3-D4 operates as an input rectifier bridge.

The PFC cell 20 also has the input terminals I1, I2 and the output terminals O1, O2 connected to a first C1 and a second capacitor C2 respectively. The PFC cell 10 is finally connected to a load Z inserted between the output terminals O1 and O2.

The combination of the capacitor C2 and of the PFC cell 20 substantially realizes an active filter driven by the driving circuit 22 and capable of controlling the harmonic content of the power absorbed by the load. In most cases, the switch SW is an electronic switch realized with an active component of the MOSFET type, driven by the integrated IC driving circuit 22 so as to adjust the conduction time thereof.

Nevertheless, the use of an integrated circuit IC for driving the electronic switch makes the circuit topology of the PFC cell 20 shown in FIG. 2 expensive and thus suitable for products of the high market range.

BRIEF SUMMARY OF THE INVENTION

The disclosed embodiments of the present invention provide a PFC cell topology having a more favourable cost-performance ratio, thus overcoming the limits and drawbacks still affecting PFC cells with an integrated IC driving circuit realized according to the prior art.

The disclosed embodiments of the invention provide a cell for controlling the power factor of a power supply line of the type having a first and a second input terminal, a first and a second output terminal, the first input terminal being connected to the first output terminal by means of the series of an inductor and of a diode, connected to each other in correspondence with an internal circuit node and the second input terminal and second output terminal being connected to each other. Ideally, a cell of the Power Factor Corrector (PFC) type is provided and the following description is made with reference to this field of application for convenience of illustration only.

The approach of the present invention utilizes the intrinsic electric features of a simply driven bipolar power transistor to modulate the conduction time thereof. In particular, if this transistor is comprised in the PFC cell, this cell is capable of modifying the waveform envelope of the current absorbed by the line, making the envelope of the same almost sinusoidal, thus obtaining a power factor PF having values close to one.

In accordance with another embodiment of the invention, a power factor control method is provided that includes the steps of: generating a control signal by means of an RC network and applying the control signal to a control terminal of a transistor to adjust a duty cycle of the transistor. Ideally, the transistor is in the form of a bipolar transistor that is provided in a cell in combination with the RC network. Preferably, the control signal is derived from an alternated signal obtained from a transformer winding.

In accordance with yet another embodiment of the invention, a method for controlling the power factor of a power supply line is provided that includes the steps of providing a bipolar transistor in combination with an RC network and a transformer winding; generating a control signal having an alternated characteristic from the winding of the transformer; and applying the control signal by means of the RC network to a control terminal of the bipolar transistor to adjust a turn-on and turn-off time of the bipolar transistor.

Ideally applying the control signal includes combining the operational characteristics of the RC network with storage time variations of the bipolar transistor and in correspondence with current variations on a collector terminal of the bipolar transistor.

In accordance with yet a further embodiment of the invention, a power factor control cell is provided that includes an inductor coupled to a first node and to a first input; a diode coupled to the first node and to a first output; a bipolar transistor having a first terminal coupled to the first node and a second terminal coupled to a second input and to a second output, and further having a control terminal; a first resistor, first capacitor, and transformer winding series coupled between the control terminal of the bipolar transistor and the second terminal of the bipolar transistor; and a second resistor coupled between the control terminal and the second terminal of the bipolar transistor.

BRIEF DESCRIPTION OF THE SEVERAL VIEWS OF THE DRAWINGS

The features and advantages of the method and cell for controlling the power factor according to the invention will be apparent from the following description of embodiments thereof given by way of non-limiting examples with reference to the attached drawings, wherein.

DETAILED DESCRIPTION OF THE INVENTION

Figure 1:
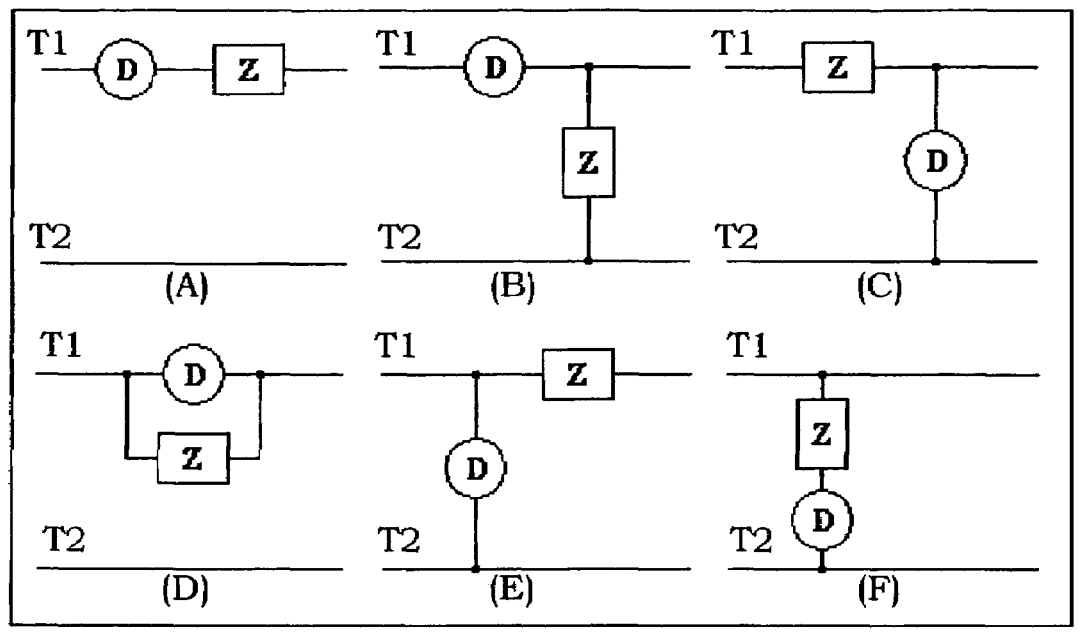
FIG. 1 schematically shows circuit topologies of first-order PFC cells based on the dither effect principle.
Figure 2:
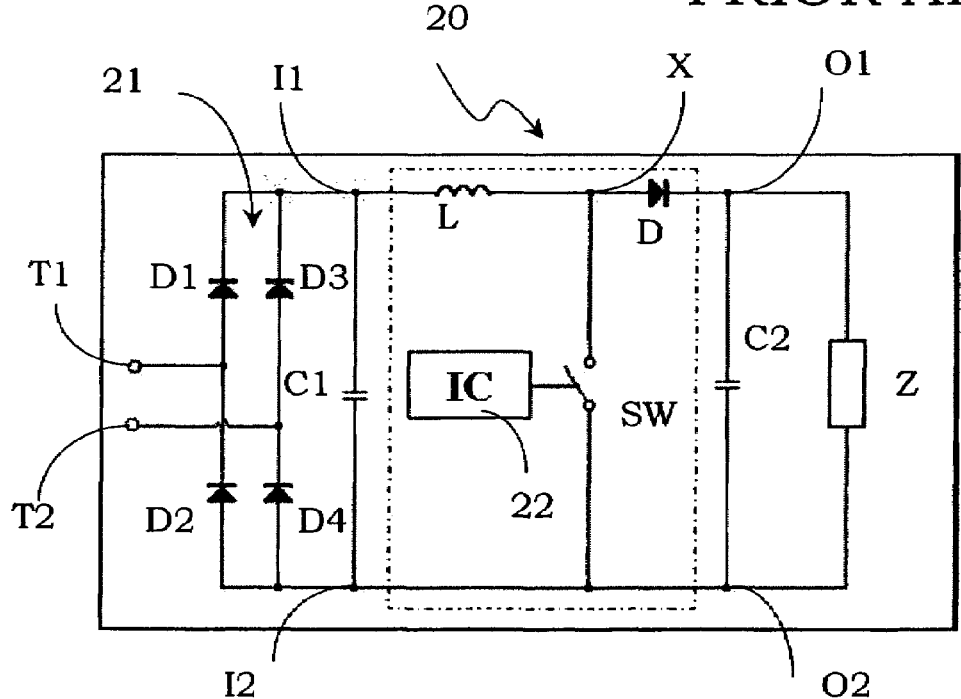
FIG. 2 schematically shows a PFC cell based on the principle of the IC-driven boost converter.
Figure 3:
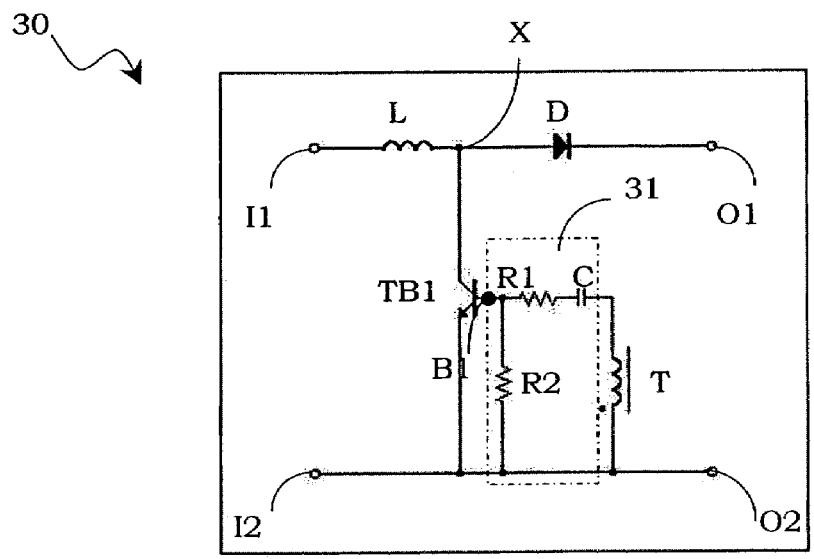
FIG. 3 schematically shows a PFC cell realized according to the invention.

With reference to the drawings, and particularly to FIG. 3, a cell for controlling the power factor of a power supply line realized according to the invention is shown hereafter and globally indicated with 30. Elements being structurally and functionally similar to the devices shown with reference to the prior art have been given the same numeral references.

Advantageously according to the invention, the PFC cell 30 essentially comprises a conveniently-driven bipolar transistor TB1.

In particular, the PFC cell 30 has a first I1 and a second input terminal I2, as well as a first O1 and a second output terminal O2.

The first input terminal I1 is connected to the first output terminal O1 by means of the series of an inductor L and a diode D, connected to each other in correspondence with an internal circuit node X.

The second input terminal I2 is directly connected to the second output terminal O2.

The bipolar transistor TB1 is inserted between the internal circuit node X and the second input terminal I2, i.e., the second output terminal O2 and it has a control terminal, particularly a base terminal B1, connected, by means of a RC network 31, to a transformer winding T, connected in turn to the second output terminal O2.

In particular, the base terminal B1 of the bipolar transistor TB1 is connected to the winding T by means of the series of a first resistor R1 and a capacitor C of the network 31, as well as to the second output terminal O2 by means of a second resistor R2 of the network 31.

It should be noted that the use of the bipolar transistor TB1 and of the particular electric features thereof together with the driving mode according to the invention allows a simple and inexpensive PFC network to be realized.

In particular, the present invention provides a method for modulating the conduction time of the bipolar transistor TB1 in the PFC cell by exploiting the phenomenon according to which the charges injected in the base terminal of a bipolar transistor allow the saturation effect of the bipolar transistor itself and they determine the conduction time thereof.

By exploiting this feature as the transistor storage time, the PFC cell 30 according to the invention thus succeeds in modulating the transistor turn-on time without inserting any integrated circuit.

Generally, the method for controlling the power factor of a power supply line according to the invention uses a cell for controlling the power factor and it performs the power factor control by adjusting the turn-on and turn-off time of a bipolar transistor comprised in the cell.

Advantageously according to the invention, the control method provides that the adjustment of the bipolar transistor turn-on and turn-off time is performed by means of a control signal derived from a signal having an elementary alternated trend being applied to the base terminal B1 of the bipolar transistor TB1, in particular obtained from a transformer winding and applied to the base terminal by means of the network 31.

It should be noted that, advantageously according to the invention, there is not only the need of a control signal to drive the bipolar transistor base terminal B1, particularly generated by an integrated circuit operating as a modulator, but this control signal is advantageously obtained from an already existing signal.

In particular, this already existing signal is a signal drawn through an additional winding on a transformer being already in the applications which normally use transformers operating at high frequency. A voltage signal generated on the transformer thus biases the base terminal B1 of the bipolar transistor TB1 through the network 31, essentially comprising a capacitor and two resistors.

It should be noted that the capacitor C, being in series with the base terminal B1, together with the resistor R1 being always in series with this base terminal B1, determine the conduction time constant of the bipolar transistor TB1, and they allow a duty cycle being less than 50% to be realized.

In particular, advantageously according to the invention, the duty cycle adjustment effect is obtained by exploiting the features of the network 31 in combination with the storage time variations of the bipolar transistor itself in correspondence with the several currents on the collector terminal to be switched by the bipolar transistor TB1. In fact, since the bipolar transistor turn-off occurs only when all the accumulated charges in the base region have been drawn, a certain delay occurs between the stage wherein the voltage does not bias the base any more and the time wherein the transistor has actually turned off.

It is also important to underline that the storage time is linked to the existing current values and, for the same base current in the conduction step, it increases when the collector current decreases. For input voltage values ranging around ±10÷15% of a nominal voltage value, the transistor adjusts the power factor PF through a modulation of the conduction time determined by the storage time thereof.

The PFC cell 30 is substantially an active PFC cell capable of modulating the conduction time of the bipolar transistor TB1.

Figure 4:
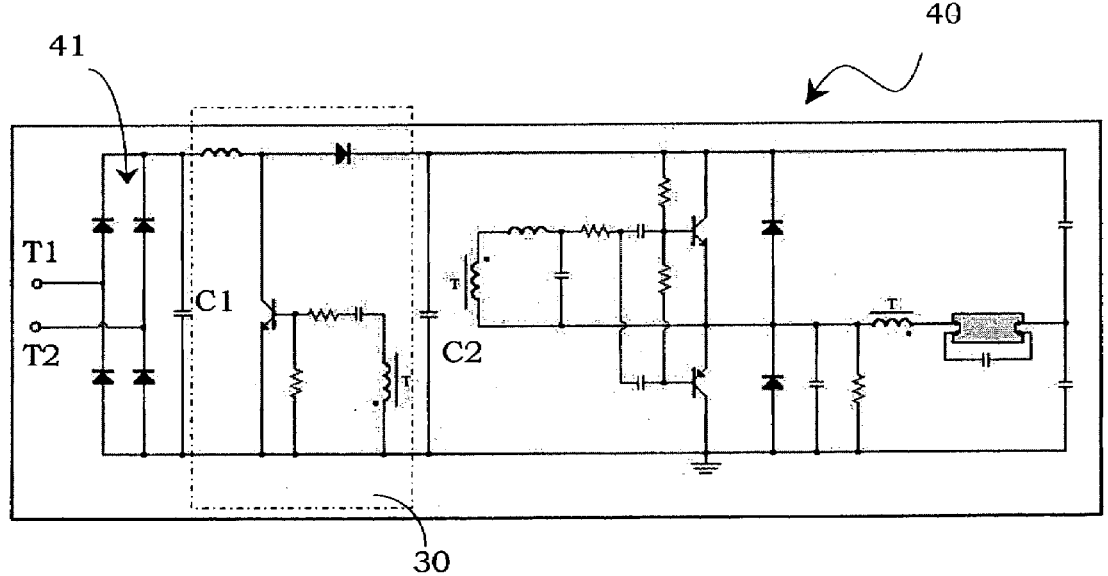
FIG. 4 schematically shows an electronic ballast comprising a PFC cell of FIG. 3.

An application of the PFC cell 30 is schematically shown in FIG. 4. In particular, the bipolar transistor driving voltage of the PFC cell 30 is obtained by means of an auxiliary winding T on a transformer of an electronic ballast 40.

The PFC cell 30 is inserted at the power supply of this electronic ballast 40 and it is connected to first and second network terminals T1, T2 by means of a diode bridge 41. The PFC cell 30 is also uncoupled at the input and output by means of capacitors C1, C2. In particular, the PFC cell 30 has the first and the second input terminals I1, I2 connected to the diode bridge 41 and the first and the second output terminals O1, O2 connected to the electronic ballast 40. Moreover, these first and second input terminals I1, I2 are connected to each other by the first capacitor C1, and these first and second output terminals O1, O2 are connected to each other by the second capacitor C2.

It should be noted, in the case being shown that the alternated voltage trend on the auxiliary winding T, in combination with the storage time feature, regulate the turn-on and turn-off time of the bipolar transistor TB1 of the PFC cell 30.

Figure 5:
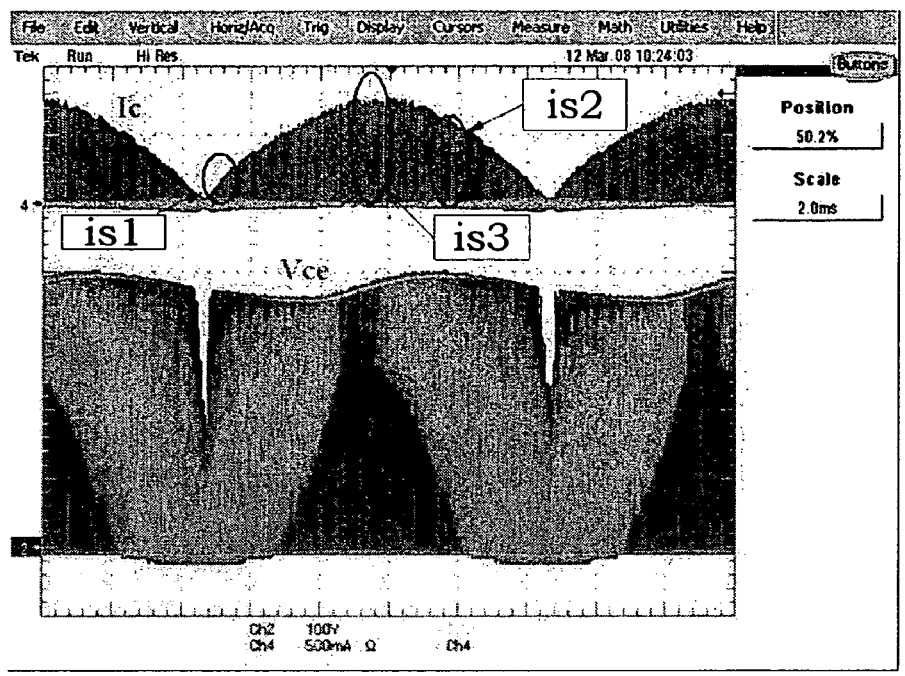
FIG. 5 shows the trend in time of signals related to the PFC cell of FIG. 3.

FIG. 5 shows the waveform related to the trend of the voltage and current at the ends of the bipolar transistor of the PFC cell 30 inserted in the electronic ballast 40. As can be noticed in FIG. 5, the trend of the current at the ends of the bipolar transistor has a sinusoidal envelope allowing thus power factor PF values close to one. In particular, in the tests carried out by the Applicant itself a power factor PF equal to 0.95 has been obtained.

On the basis of the results shown in FIG. 5, it is possible to further clarify the operation of the PFC cell 30 according to the invention and particularly the different conduction moments of the bipolar transistor comprised therein, by analysing the instants is1, is2 and is3 underlined in FIG. 5.

In particular, FIGS. 6 to 10 refer to the details of these instants is1, is2 and is3.

It can be immediately verified that the transistor turn-on time is determined by the charge injection step in the base terminal thereof and by the removal thereof. Moreover, this phenomenon actually determines an adjustment and a slightly variable duty cycle.

Figure 6:
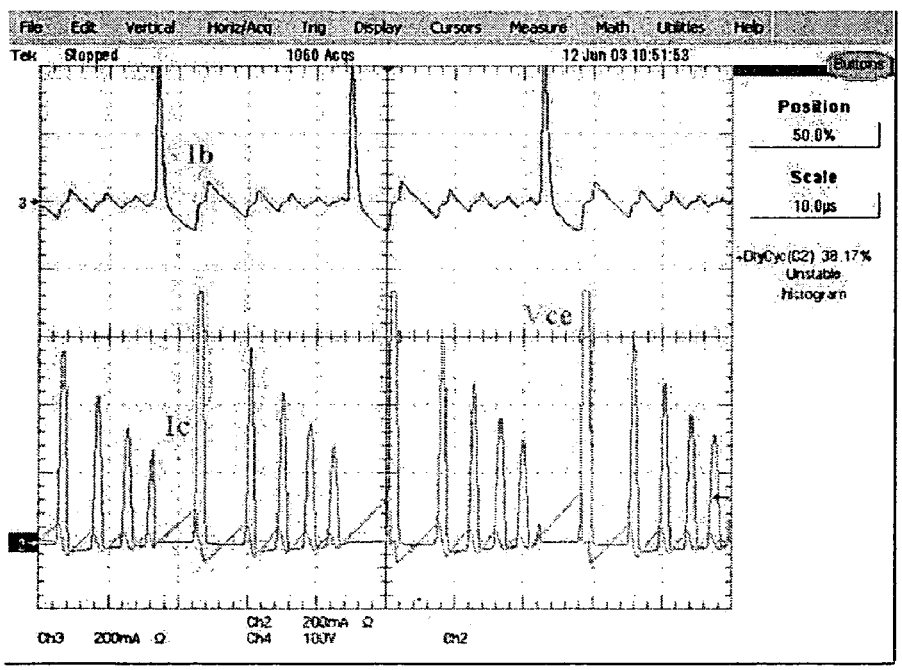
FIGS. 6 to 10 show details of the diagram of FIG. 5 in greater detail.
Figure 7:
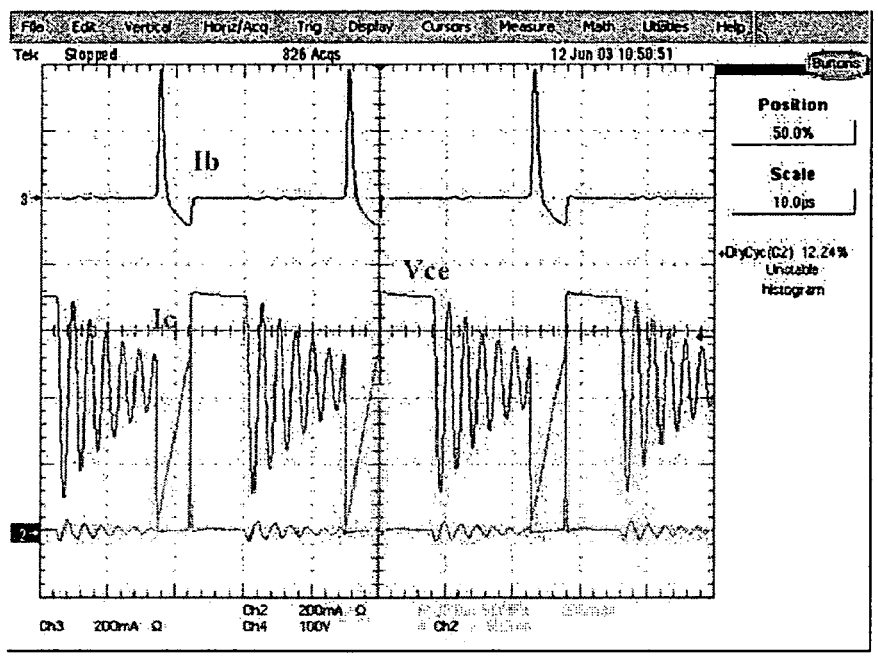
Figure 8:
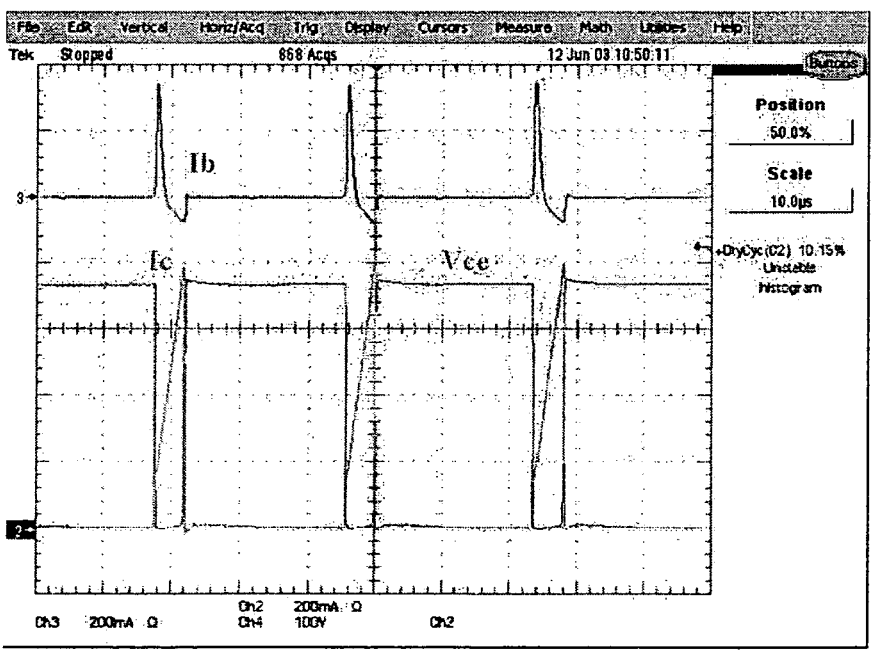

In fact, since the peak of the base current Ib is almost constant, high values of the collector current Ic occur with respect to the values of the base current Ib in a first step (as shown in FIG. 8 for the instant is3) and lower forced Hfe values in the following steps (as shown in FIG. 6 for the instant is1), therefore an over-saturation occurs for low values of the collector current Ic (higher duty cycle) and a saturation for high values of the collector current Ic (lower duty cycle). FIG. 7 shows an instant of intermediate forced Hfe values between the instants is1 and is3.

Figure 9:
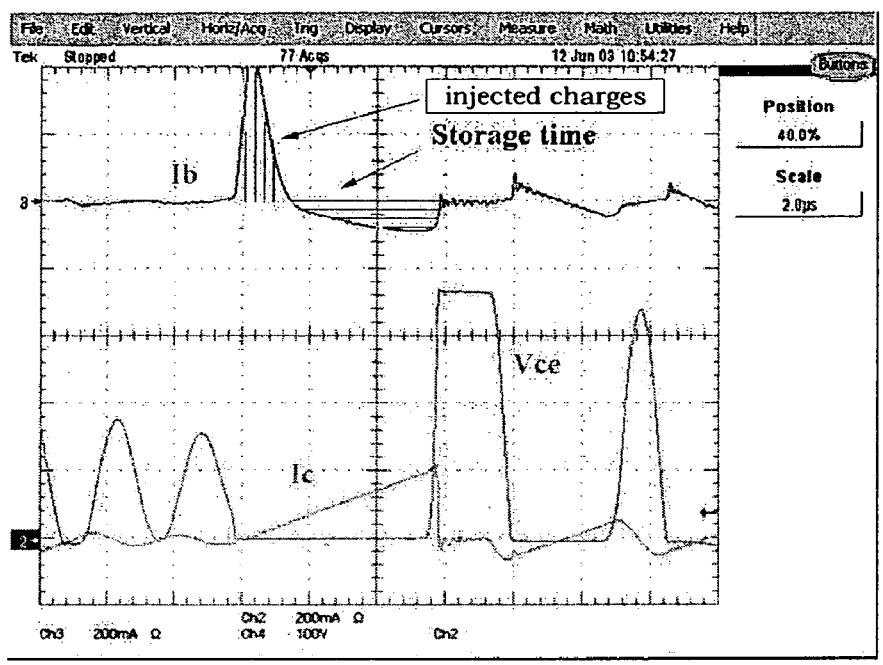
Figure 10:
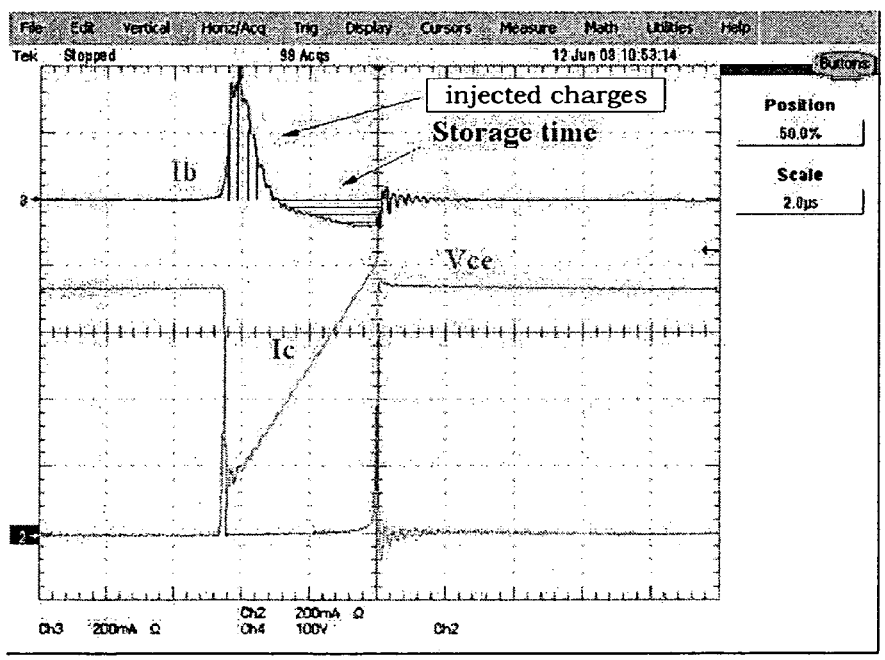

FIGS. 9 and 10 show the details related to the instants is1 and is3. As can be noticed, the bipolar transistor turn-on lasts since the charges have been injected in the base region until the complete removal thereof. FIGS. 9 and 10 show that, for the same peak of the injected base current Ib, the device turn-on time depends on the storage time thereof. In fact, as shown in FIG. 10, it is evident that this latter is lower than in FIG. 9 just by virtue of the dependence of this parameter on the collector current Ic and thus on the transistor saturation level.

The required modulation has thus been obtained so that the current absorbed by the network is almost sinusoidal.

Substantially, the inductor L, the diode D, and the bipolar transistor TB1 of the PFC cell according to the invention realize a network, interposed between a rectifier bridge and a high frequency section, capable of modifying the waveform envelope of the current absorbed by the line, making the envelope thereof almost sinusoidal, thus obtaining a power factor PF with values close to one.

The results obtained in the case of an electronic ballast 40 being shown prove that the active PFC cell 30 can be used in all those cases wherein a modulation of the conduction time of a power device must be performed without resorting to systems using integrated circuits.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims and the equivalents thereof.

The invention claimed is:

1. A cell for controlling the power factor of a power supply line, comprising: first and second input terminals, first and second output terminals, the first input terminal connected to the first output terminal by means of series connected inductor and diode, connected to each other in correspondence with an internal circuit node and the second input terminal and second output terminal being connected to each other, and a bipolar transistor inserted between the internal circuit node and the second input terminal and having a control terminal coupled, by means of an RC network, to a transformer winding and receiving a control signal derived from an alternating signal, the RC network comprising a first resistor coupled in series to a capacitor between the control terminal of the bipolar transistor and the transformer winding.

2. The control cell of claim 1 wherein the RC network further comprises a second resistor inserted between the control terminal of the bipolar transistor and the second output terminal of the cell.

3. An electronic ballast, comprising a power factor control cell that includes first and second input terminals, first and second output terminals, the first input terminal connected to the first output terminal by means of series connected inductor and diode, connected to each other in correspondence with an internal circuit node and the second input terminal and second output terminal being connected to each other, and a bipolar transistor inserted between the internal circuit node and the second input terminal and having a control terminal coupled, by means of an RC network, to a transformer winding and receiving a control signal derived from an alternated signal, the RC network comprising a first resistor coupled in series to a capacitor between the control terminal of the bipolar transistor and the transformer winding that in turn is coupled to the second output terminal of the control cell.

4. The ballast of claim 3 wherein the control terminal of said bipolar transistor is connected by means of an RC network to a transformer winding.

5. The ballast of claim 4 wherein the RC network comprises a first resistor connected in series to a capacitor between the control terminal of the bipolar transistor and the first input terminal of the control cell.

6. The ballast of claim 5 wherein the RC network further comprises a second resistor inserted between the control terminal of the bipolar transistor and the first input terminal of the cell.

7. A method for controlling a power factor of a power supply line, comprising:
  providing first and second input terminals, first and second output terminals, the first input terminal connected to the first output terminal by means of series connected inductor and diode, connected to each other in correspondence with an internal circuit node and the second input terminal and second output terminal being connected to each other, and a bipolar transistor inserted between the internal circuit node and the second input terminal and having a control terminal connected, by means of an RC network, to a transformer winding and receiving a control signal derived from a primary signal, the RC network comprising a first resistor connected in series to a capacitor between the control terminal of the bipolar transistor and the first input terminal of the control cell;
  generating a control signal having an alternating characteristic from the winding of the transformer; and
  applying the control signal by means of the RC network to a control terminal of the bipolar transistor to adjust a turn-on and turn-off time of the bipolar transistor.

8. The method of claim 7 wherein applying the control signal comprises combining the operational characteristics of the RC network with storage time variations of the bipolar transistor and in correspondence with current variations on a collector terminal of the bipolar transistor.

9. The method of claim 7 wherein the control signal is generated to adjust the duty cycle of the bipolar transistor in combination with the RC network and the transformer winding.

10. A power factor control cell, comprising:
  an inductor coupled to a first node and to a first input;
  a diode coupled to the first node and to a first output;
  a bipolar transistor having a first terminal coupled to the first node and a second terminal coupled to a second input and to a second output, and further having a control terminal;
  a first resistor, first capacitor, and transformer winding series coupled between the control terminal of the bipolar transistor and the second terminal of the bipolar transistor; and
  a second resistor coupled between the control terminal and the second terminal of the bipolar transistor.

11. The cell of claim 10 wherein the first and second resistors and the capacitor comprise an RC network and wherein a control signal is generated to the control terminal of the bipolar transistor by the transformer winding applied to the control terminal by means of the RC network.

12. The cell of claim 10 wherein the bipolar transistor, the RC network, and the transformer winding are configured to adjust the turn-on time and the turn-off time of the bipolar transistor by combining the characteristics of the RC network with storage time variations of the bipolar transistor in correspondence with current variations on a collector terminal of the bipolar transistor.

13. A circuit for controlling the power factor of a power supply line, comprising: first and second input terminals, first and second output terminals, the first input terminal connected to the first output terminal by means of series connected inductor and diode that are connected to each other at an internal circuit node, and the second input terminal and second output terminal connected to each other, and a bipolar transistor inserted between the internal circuit node and the second output terminal and having a control terminal receiving a control signal, the control terminal of the bipolar transistor connected by an RC circuit to a transformer winding that is coupled to the second output, the RC network comprising a first resistor connected in series to a capacitor coupled between the control terminal of the bipolar transistor and the transformer winding, and the RC network further comprising a second resistor inserted between the control terminal of the bipolar transistor and the second output terminal of the circuit.

14. The circuit of claim 13 wherein the transformer winding is structured to generate the control signal.

15. The circuit of claim 13 wherein a collector terminal of the bipolar transistor is coupled to the internal circuit node and a drain of the bipolar transistor is coupled to the second output terminal.

* * * * *

UNITED STATES PATENT AND TRADEMARK OFFICE
CERTIFICATE OF CORRECTION

PATENT NO.         : 7,391,198 B2
APPLICATION NO.    : 11/041519
DATED              : June 24, 2008
INVENTOR(S)        : Rosario Scollo et al.

It is certified that error appears in the above-identified patent and that said Letters Patent is hereby corrected as shown below:

Column 7
Line 27, "network to a transformer winding" should read as -- network to the transformer winding --

Claim 5, lines 28-31, should be deleted.

Line 32, "The ballast of claim 5" should read as -- The ballast of claim 4 --

Line 55, "a control terminal of the bipolar transistor to adjust" should read as -- the control terminal of the bipolar transistor to adjust --

Column 8
Line 28, "adjust the turn-on time and the turn-off time of the bipolar" should read as -- adjust a turn-on time and turn-off time of the bipolar --

Signed and Sealed this

Twenty-seventh Day of July, 2010

David J. Kappos
*Director of the United States Patent and Trademark Office*